March 27, 1962 J. H. CLAY 3,026,624
AUTOMATIC CENTERING CALIPER
Filed May 28, 1959
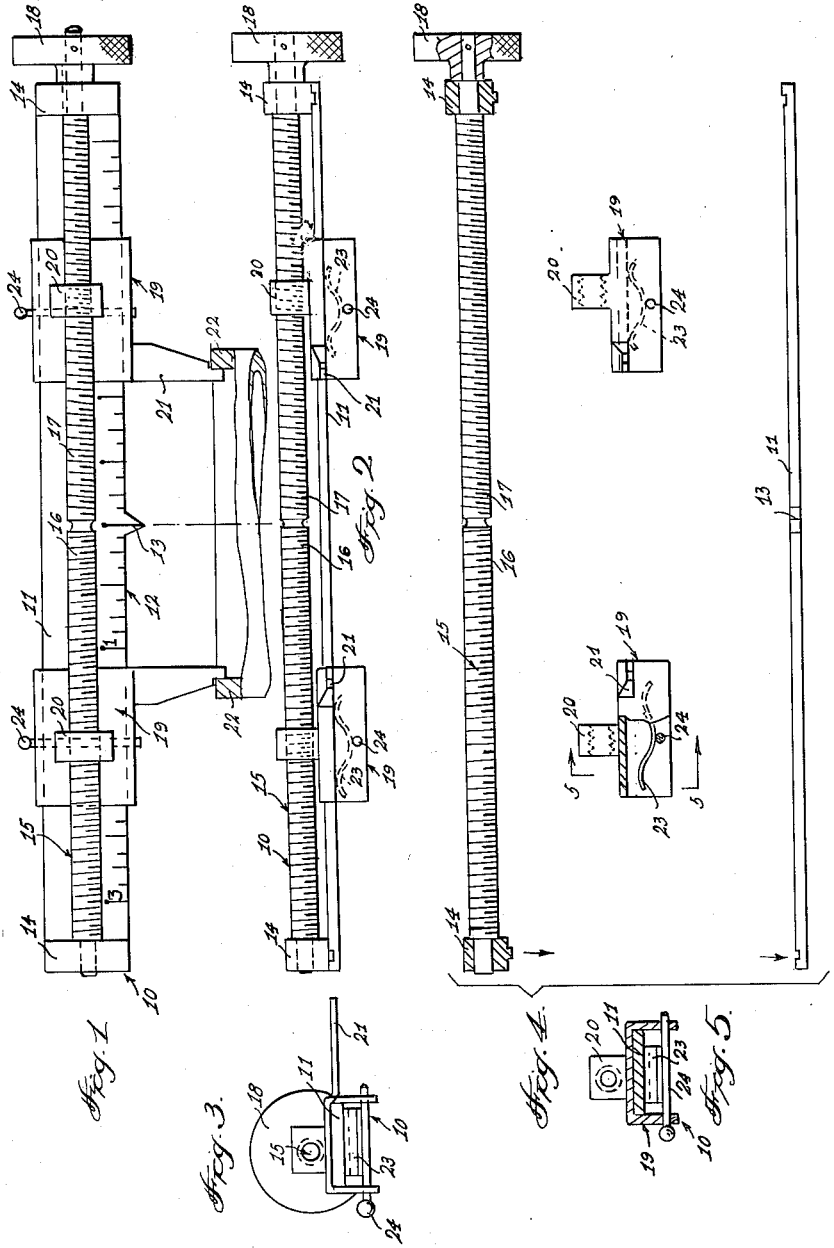
INVENTOR.
JAMES H. CLAY
BY
ATTORNEYS

United States Patent Office 3,026,624
Patented Mar. 27, 1962

3,026,624
AUTOMATIC CENTERING CALIPER
James H. Clay, 1318 S. Henderson,
Bloomington, Ind.
Filed May 28, 1959, Ser. No. 816,482
1 Claim. (Cl. 33—191)

This invention relates to a caliper device, and more particularly to a caliper device which will automatically indicate the exact center or mid-distance between two major jaws.

The object of the invention is to provide an automatic centering caliper which includes a pair of jaws which will move in opposite directions at the same rate of travel so as to keep each of the jaws at equi-distant points from the center of the instrument.

Another object of the invention is to provide an automatic centering caliper which includes graduated scales that are arranged on either side of the center so as to show on the right side the total distance between the jaws, while on the left side the distance to center pin is shown.

A further object of the invention is to provide an automatic centering caliper which is of a simple design and which is accurate to use and which is simple and inexpensive to manufacture or make.

Other objects and advantages of the invention will be apparent in the course of the following description.

In the accompanying drawing, forming a part of this application, and in which like numerals are used to designate like parts throughout the same:

FIGURE 1 is a plan view of the automatic centering caliper of the present invention.

FIGURE 2 is an elevational view of the automatic centering caliper of the present invention, with parts broken away and in section.

FIGURE 3 is an end elevational view.

FIGURE 4 is a fragmentary sectional view showing the parts separated or disassembled.

FIGURE 5 is a sectional view taken on line 5—5 of FIGURE 4.

Referring in detail to the drawing, the numeral 10 indicates the automatic centering caliper of the present invention which is shown to comprise an elongated flat body member 11 that has calibrations or scale markings 12 thereon. A pointer 13 extends from the body member 11 for a purpose to be later described.

Bearings 14 are arranged on the ends of the body member 11, and a shaft 15 is supported by the bearings 14, the shaft 15 including right and left hand threaded portions 16 and 17. A manually operable knob 18 is connected to an end of the shaft 15 for use in rotating the shaft.

There is further provided a pair of adjustable or slidable support members 19.

Each of the support members 19 has secured thereto or formed integral therewith an internally threaded collar or sleeve 20, and the collars 20 are arranged in threaded engagement with the portions 16 and 17 of the shaft 15. A jaw 21 extends from each support member 19 and the jaws 21 are adjusted to engage a work piece such as the work piece 22 which is being measured.

As shown in FIGURES 4 and 5 for example, a spring member 23 is carried by each support member 19, and spring members 23 bear against or engage the body member 11 so as to prevent slippage of the support members on the body member. A pin 24 helps maintain or retain the spring members 23 in their proper positions.

From the foregoing, it is apparent that there has been provided an automatic centering caliper, and in use, with the parts assembled as shown in FIGURES 1 and 2 and 3 for example it will be seen that by manually manipulating or rotating the knob 18, the shaft 15 will be turned or rotated and this will cause movement of the members 19 toward and away from each other so that the jaws 21 can be positioned at the desired location. Thus, the threaded collars 20 on the members 19 engage the right and left hand threaded portions 16 and 17 of the shaft 15 so that by properly rotating the knob 18 the jaws 21 can be moved toward and away from each other, as for example the jaws can be arranged as shown in FIGURE 1 wherein the jaws engage a member such as the cylindrical pipe or member 22. The graduations are scale markings 12 on the member 11 providing a means for accurately using or reading the instrument, and the pointer 13 can be used for locating the center of a member such as the member 22. The spring members 23 bear against the body member 11 so as to help maintain the jaws stationary in their adjusted positions.

The parts can be made of any suitable material and in different shapes or sizes.

In the present invention, it will be seen that there has been provided a caliper device which will automatically indicate the exact center or mid-distance between two major jaws. The actuating mechanism consists of the screw member or shaft 15 which has on one end a left hand thread 17, as opposed to a right hand thread 16 on the other end and both of these threaded portions are on one length of shaft. The threads being right and left hand, serve to move both jaws 21 in opposite directions at the same rate of travel which, in turn, keeps each at equi-distant points from the center of the instrument. The graduated scale 12 on either side of the center 13 serves to show on the right side the total distance between the jaws, while on the left side the distance to the second pin. The inside measuring scale is on the back side of the instrument. The present invention embodies a simple design and has a high degree of accuracy and is characterized by low production cost.

There is provided two sliding jaws 21, one for the right hand and one for the left hand. The shaft 15 supports the bearings 14, and the shaft is rotated by the knurled knob 18. The pointer 13 indicates the center between the sliding jaws 21. The pin 24 retains the spring member 23 in place and the spring member serves to hold tension on the jaws. Calibrations 12 are arranged on both sides so as to provide a means for indicating both inside and outside dimensions.

Minor changes in shape, size and rearrangement of details coming within the field of invention claimed may be resorted to in actual practice, if desired.

I claim:

In an automatic centering caliper, an elongated flat body member, having calibrations thereon, bearings positioned on the ends of said body member and secured thereto in parallel relation to said body member, a shaft supported by said bearings, said shaft extending longitudinally of and in parallel superimposed relation to said body member, said shaft being provided with right and left hand threaded portions, a knob connected to one end of said shaft, slidable support members positioned contiguous to said body member, each of said support members being of inverted U-shape and comprising a bight portion that is in contactual relation with said body member and a pair of oppositely disposed depending leg portions positioned on opposite side edges of said body member, jaws extending from said support members, collars extending from said support members and engaging the right and left hand threaded portions of said shaft, a pointer extending from the medial edge portion of said body member, a spring member connected to each support member intermediate of the leg portions thereon for engagement with said body member and a pin extended through the leg of each of said support members transversely thereof and at right angles to the spring member mounted therein and engaging said spring member to retain said spring member in position intermediate of the legs of said support member.

References Cited in the file of this patent

UNITED STATES PATENTS

| | | |
|---|---|---|
| 1,280,138 | Blair | Oct. 1, 1918 |
| 1,280,379 | Bonney | Oct. 1, 1918 |
| 2,559,280 | Cochran | July 3, 1951 |